United States Patent Office
3,470,396
Patented Sept. 30, 1969

3,470,396
ELECTRIC MACHINE HAVING A ROTATING SUPERCONDUCTING EXCITATION WINDING
Wilhelm Kafka, Tennenlohe, Germany, assignor to Siemens Aktiengesellschaft, Erlangen, Germany, a corporation of Germany
Filed Jan. 28, 1966, Ser. No. 523,593
Claims priority, application Germany, Feb. 6, 1965,
S 95,346
Int. Cl. H02k 1/22, 3/48, 9/20
U.S. Cl. 310—10
18 Claims

ABSTRACT OF THE DISCLOSURE

An electric machine includes a rotor having an elongated iron core, carrier band means mounted substantially at the surface of the iron core and having opposing portions extending in the longitudinal direction of the iron core, a superconductive excitation winding carried by the carrier band means and wound around the iron core in the direction of the carrier band means, and tie rod means connecting the portions of the carrier band means, the winding and the iron core being adapted to produce magnetic forces therebetween compensating for most of a centrifugal force to which the winding is subject during rotation of the rotor, the tie rods being adapted to absorb the balance of the centrifugal force.

My invention relates to machines having superconducting excitation windings. More particularly, it relates to such improved machines wherein centrifugal forces acting upon the winding are not transmitted to the heat insulation.

Machines comprising superconducting excitation windings present the problem of the necessity of controlling the centrifugal forces acting upon these windings. The conservative method of capturing these forces through the winding insulation through an outer groove edge or groove key does not provide a satisfactory solution to such problem. Heat insulations with good heat resistance are highly pressure-responsive. Since heat insulation surrounding the superconducting winding rods would be pressed together at the outer edge of the rods during the rotation of the windings, it would thereby lose its beneficial qualities.

Accordingly, it is an important object of this invention to provide a machine having a rotating superconducting excitation winding in which the centrifugal forces which act upon the winding portions cannot be transmitted to the heat insulation which envelops the winding portions whereby a pressure-responsive heat insulation with very high heat resistance may be employed.

This object is achieved by largely compensating for the centrifugal forces acting upon the winding with magnetic forces between the rotor iron and the coil. The remainder of the centrifugal forces are eliminated by the use of the rods which act upon the enclosures, i.e., carrier portions of the winding.

In many situations, it is sufficient that the centrifugal forces which act radially outwardly are restrained by the heat insulation. The tangential forces as well as the forces of gravity acting upon the coil rods can be frequently absorbed by the winding insulation. However, additional tie rods or bars may be provided which are attached to the rotor iron and which maintain the winding in a desired position. The coils are preferably wound in a plane without any crimping and suitably comprise two straight and two semi-circular portions. The tie rods do not have to be designed to be sufficiently strong such that they can absorb the maximum centrifugal forces which may occur without any detrimental effect thereon since a large portion of such forces are to be compensated for with magnetic forces. An appropriately less strong design may be undertaken, however, only if two factors are taken into account. First, measures must be taken to ensure that the magnetic forces vary in the same proportion as the centrifugal forces which depend upon the number of rotations, i.e., the rotational velocity. Such measures may be implemented, for example, by a program-controlled excitation. For this purpose, the strength of and the thrust at the tie rods may also be measured and used as an index value for a regulator which influences the excitation. Secondly, in machines whose stator circuits may be subjected to short circuits, care must be taken that the latter does not unduly influence the excitation. The latter problem is further explained immediately hereinbelow.

In cases where single or multi-pole short circuits occur at the stator side of a turbo-generator having a superconducting excitation winding, alternating currents occur in the excitation circuit which become superimposed on the excitation direct current. These alternating currents produce losses in the superconductor which increase the temperature thereof. In addition, the maximum current increases in the excitation coil to present the undesired possibility that the transition temperature might be exceeded, i.e., the temperature for the transition of the winding from the superconducting to the normally conducting state. In this latter situation, the excitation current would fall to almost zero value within a very short period without any possibility of the number of revolutions also being correspondingly rapidly reduced. In fact, because of the elimination of the moment of load rotation, the number of revolutions may actually be increased until the turbine regulator begins to operate. The centrifugal forces acting upon the winding are no longer compensated for because of the elimination of the excitation current whereby the relatively weakly constructed tie rods might break.

To avoid the aforementioned possible occurrences, the excitation winding must be constructed such that it does not undergo a transition even in the event of short circuits. To this end, the following measures may be taken. The superconductor of the excitation winding is designed to be of such magnitude that its heating by alternating currents and the increase of the maximum current value do not result in the exceeding of the critical current value. The adverse results may also be prevented by increasing the idling excitation whereby the armature operation represents only a fraction. Though such measures entail an appropriate enlarging of the superconducting winding, it enables a saving on material, i.e., a more efficient utilization of the generator. The increase in the idling excitation may also be effected by an increase in the air gap inductance whereby the stator teeth and the rotor are saturated. The yoke of the stator may be, thereby, so enlarged whereby the iron does not become over-saturated. The utilizable output of the generator increases in proportion to the inductance of the air gap. The iron losses in the stator increase because of the greater amount of magnetic flux, but, despite such flux increase, the overall efficiency is improved since the idling and copper losses do not increase. The stronger rotor excitation facilitates the magnetic compensation of the centrifugal forces. The increased air gap inductance and the saturation of the groove teeth in the stator would reduce the stator control and would increase the pulse short-circuit current. The latter must be counteracted with a different design of the stator winding such as with less but larger grooves therein, for example. The idling short circuit ratio is preferably increased to values above 2 as compared to presently used values of 0.8 to 1.2. The more often the second preventive measure is employed, i.e., to prevent the adverse consequences where short circuits occur, the less need is there to resort to the first measure, i.e., the overenlarging of the superconducting excitation winding. A relatively strong damping winding may be of assistance in reducing the current peaks in the excitation winding.

Generally speaking and in accordance with the invention, there is provided an electric machine comprising a rotating superconducting excitation winding on a rotor having an iron core, a hollow groove rod, a tape-shaped carrier band disposed within the rod, the winding being affixed to portions of the carrier band, heat insulation surrounding the carrier band, and tie rod means disposed between the carrier band attachment portions, the strength of the excitation of the winding being selected in dependence upon the rotational velocity of the rotor whereby the magnetic forces between the winding and the rotor core essentially compensate for the bulk of the centrifugal forces produced during the rotation, the tie rods absorbing the remaining centrifugal forces.

The foregoing and more specific objects and features of my invention will be apparent from and will be mentioned in the following description of an electric machine having a rotating superconducting excitation winding according to the invention shown by way of example in the accompanying drawing.

In the drawing, FIG. 1 is a cross-sectional view of an illustrative embodiment of a two-pole rotor of a turbo-generator having a superconducting excitation winding according to the invention, taken along lines I—I of FIG. 2;

Figure 1:
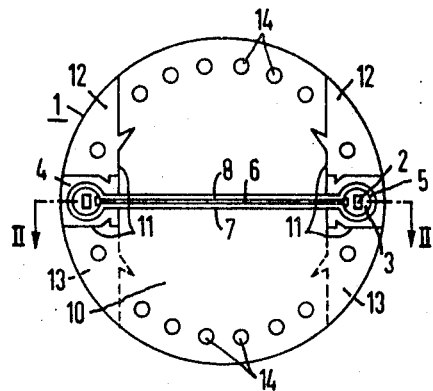
Figure 2:
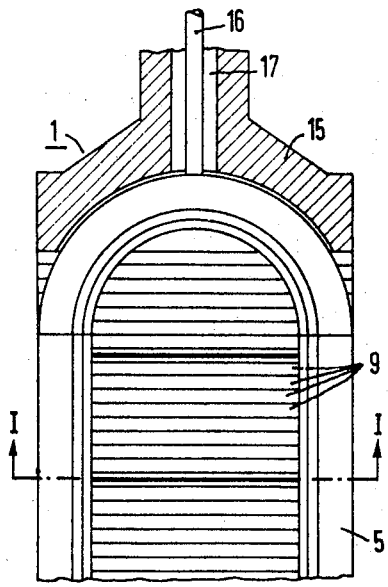
FIG. 2 is a view taken along lines II—II of FIG. 1.

Referring now to FIGS. 1 and 2, there is shown therein a two-pole rotor 1 of a turbo-generator having a superconducting excitation winding 2. The excitation winding is affixed within a band type carrier portion 3 which is disposed in a hollow groove rod 4. Rod 4 is tightly wedged in the rotor iron and extends, as seen in FIG. 2, also to a side of the rotor, suitably referred to as the "front" side. An annular hollow space between carrier band 3 and hollow groove rod 4 is filled with a pressure resistant heat insulation such as crumpled foil, for example. In order to ensure that carrier band 3 does not exert a crushing pressure on the heat insulation from the exterior during the rotation of the rotor, the excitation is selected in dependence upon the number of revolutions per minute of the rotor such that the magnetic forces between the rotor iron and the winding compensate, to a large extent, for the centrifugal forces. The remainder of the centrifugal forces is absorbed by the tie rods 6 which act at the carrier band 3 portions of the winding and, if necessary, may be affixed at the center at the rotor iron.

FIG. 2 shows that several tie rods are provided which are disposed in the axial direction of the rotor. Since the tie rods affect the carrier band which has superconducting temperatures, they have the same temperatures at these locations as does the superconducting wire. In order to prevent heat losses across the tie rods, the latter are also insulated against surrounding heat by being disposed within sleeves which are filled with heat insulation 8. The tie rods and the winding portions which are thereby mechanically connected comprise, within themselves, a closed mechanical system. All parts of this system are at very low temperatures and, during appropriate excitation, the system does not exert any radial forces upon its surroundings. Only the tangential forces and the forces of gravity are not compensated for and these have to be absorbed by the heat insulation. However, compared to the centrifugal forces, the tangential and gravity forces are quite small. The radial and tangential forces may also be eliminated by providing an arrangement as is shown in FIG. 3 as is further described hereinbelow.

The rotor shown in the arrangement of FIGS. 1 and 2 comprises individual laminations 9 as shown in FIG. 2. Such laminations are designed, as shown in FIG. 1 such that they may be stacked within the completed superconducting winding. The uppermost laminations 10, shown in FIG. 1, is provided with angular notches 11 so that the respective laminations may be inserted between the groove rods 4 from below. A tensioning is effected by the laminated members 12, which are inserted perpendicular to the lamination plane. The lamination lying below is not inserted from below but from above, between the winding rods and has a supplemental portion 13, indicated by broken lines. After being stacked, the column of laminations is provided with a support frame by means of axially disposed bars 14, between the two front portions 15.

FIG. 2 shows a suitable arrangement for supplying the cooling medium. The cooling liquid is supplied and removed through the axle. A centrally positioned tube is provided through which the cooling liquid is introduced and an axial hollow space 17 is provided through which the cooling medium is removed. The details of the cooling arrangement are described hereinbelow in connection with FIG. 8. The cooling of the superconducting winding may be effected, for example, as a result of the fact that a conduit for the cooling medium is passed through carrier band 3. Carrier band 3 may also have a cooling coil wound there around through which the cooling liquid is then passed. The latter arrangement is illustrated in FIG. 3.

Figure 3:
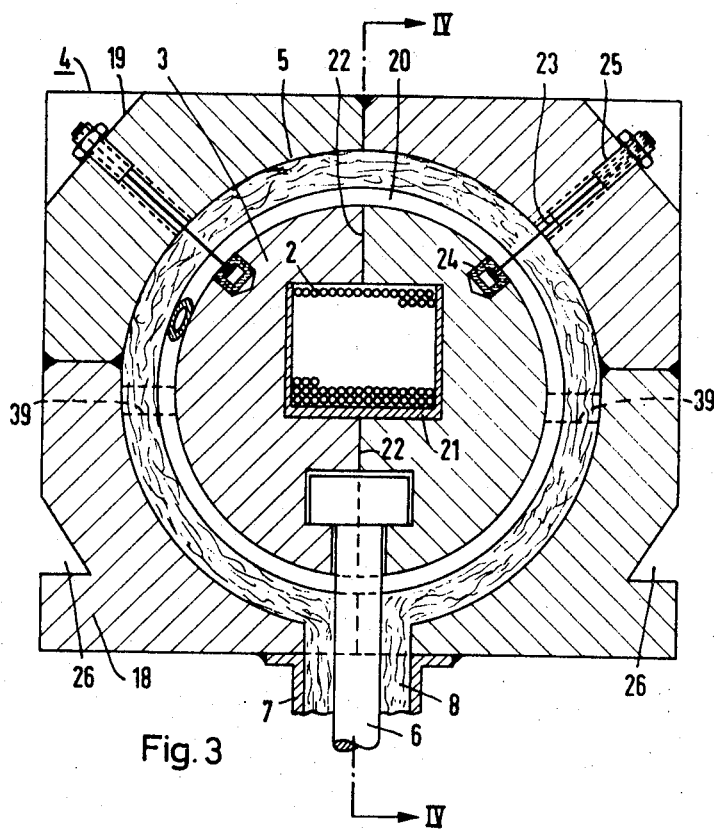
FIG. 3 is a view taken along lines III—III of FIG. 4 showing the groove rods of the rotor shown in FIGS. 1 and 2.
Figure 4:
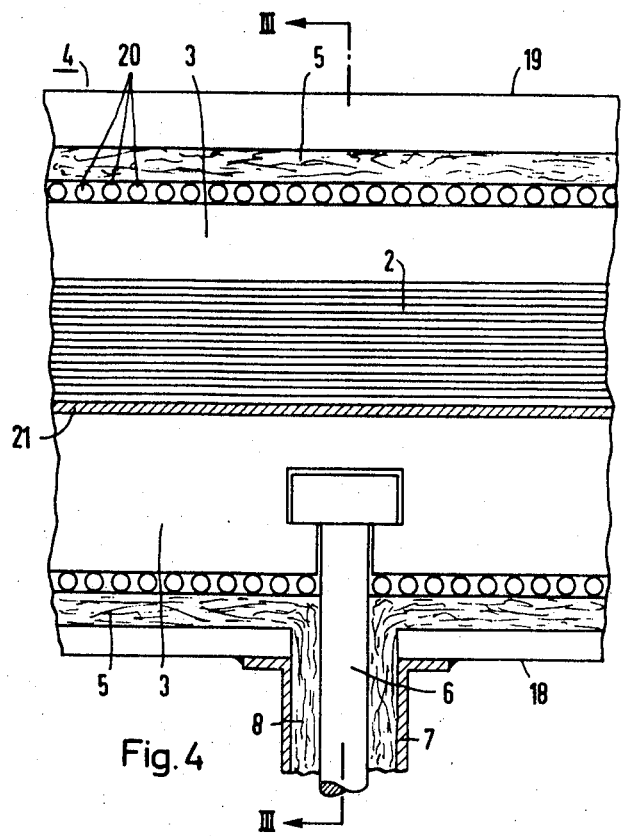
FIG. 4 is a view taken along lines IV—IV of FIG. 3.

FIGS. 3 and 4 show an enlarged cross section through groove rods 4. A groove rod consists of an inner portion 18 which is made from a material having a particularly high saturation inductance such as cobalt-iron, for example, and of an outer portion 19 which is non-magnetic. With this construction, there is effected radially, inwardly acting magnetic forces on the winding portions, i.e., in a direction opposite to that of the centrifugal forces. Carrier band 3 is comprised of a material having good heat-conducting properties whereby, together with the action of the cooling coil 20 which is wound around the carrier band, the temperature of the superconducting wire can be reduced to the required low level. The cooling coil is surrounded by the heat insulation 5. For ease in manufacturing, carrier band 3 is longitudinally divided and the superconducting wire is inserted into a U-shaped bus bar 21 which may be suitably of copper. The superconducting wire is wound around the bus bar. Then, the latter is inserted together with tie rods 6 into one half of the carrier band. The other half of the carrier band is soldered tightly at the edge of the dividing area 22, the cooling coil is wound around and, finally, all of the structures are inserted into the groove rod, insulated against heat. Thereafter, the rotor laminations are stacked as described in connection with FIG. 1. As has been already mentioned hereinabove, it may be advantageous to absorb the tangential forces and the gravity forces acting upon the carrier band with additional tie rods. In FIG. 3, two of these additional tie rods are shown, such rods suitably being comprised of thin nylon threads 23 which have great heat resistance. The nylon threads are anchored in carrier band 3 and groove rod 4 which is affixed in the rotor iron. Such affixing location in the carrier band is designated by the numeral 24, the tensile attachment point in the groove rod being at the location designated by the numeral 25. In contradistinction to a tie bar 6 which may have superconducting temperature along its entire length, nylon thread tie bars 23 are disposed between mechanical parts which exhibit a large difference in temperatures. Nevertheless, the heat loss across the nylon thread is not particularly great because the thread has a relatively small cross section and a relatively great length. As mentioned hereinabove, the forces to be absorbed by the thread are relatively small and, essentially, they may be captured by the spacers 39, shown in dashed lines which are disposed between the carrier band and groove rod and which have a relatively thin cross section. However, because of buckling strength, the ratio of diameter to length may not be able to be chosen to be as small as in the case of the tie rod and, therefore, greater heat losses may have to be taken into account. The notches 26 function to maintain the groove rods in appropriate lugs of the rotor laminations.

Figure 5:
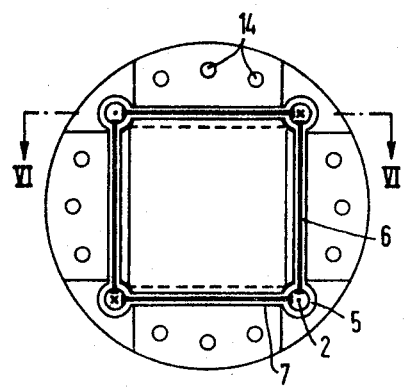
FIG. 5 is a view of a four-pole rotor of a turbo-generator according to the invention taken along lines V—V of FIG. 6.
Figure 6:
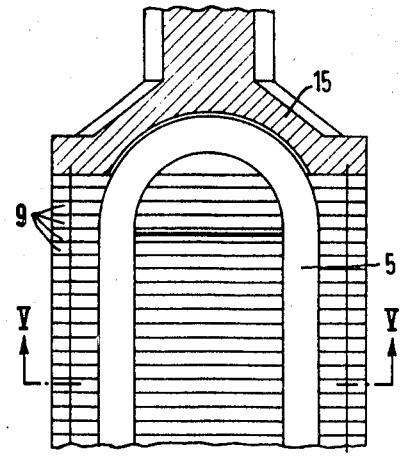
FIG. 6 is a view taken along lines VI—VI of FIG. 5.

The example of a four-pole rotor shown in FIGS. 5 and 6 illustrates a type of tensioning means. In this illustration, the tie rods are polygonally arranged and not radially. In this type of tensioning means, the tie rods together with the superconducting windings also form a low temperature, closed mechanical system which does not exert substantial outward forces when appropriately excited, and thus, may be surrounded by a pressure responsive heat insulation. In order to produce radially directed magnetic forces and to enable the stacking alternately of the rotor laminations in the completed winding system, rotor grooves are chosen which have an opening angle of about 90°.

Figure 7:
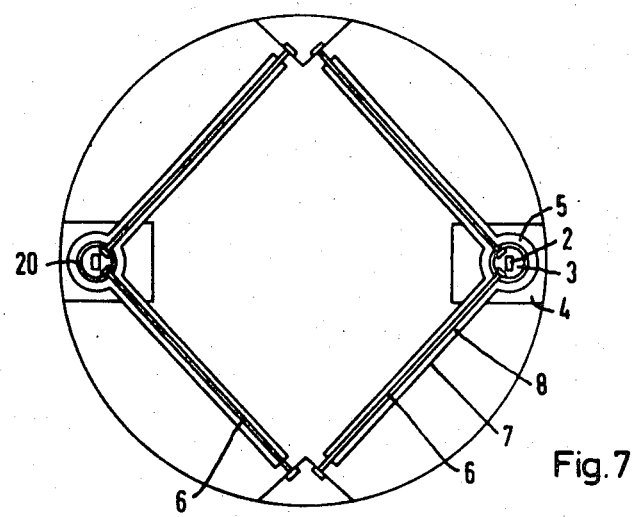
FIG. 7 is a cross-sectional view of a two-pole rotor of a turbo-generator.

In FIG. 7, there is shown a type of tensioning arrangement for a two-pole rotor wherein the tie bars absorb the difference between the centrifugal forces and the magnetic attraction forces, and at the same time, the tangential forces which occur as a result of the load. These tie rods may also be combined with tie rods in accordance with the arrangement shown in FIG. 1.

Figure 8:
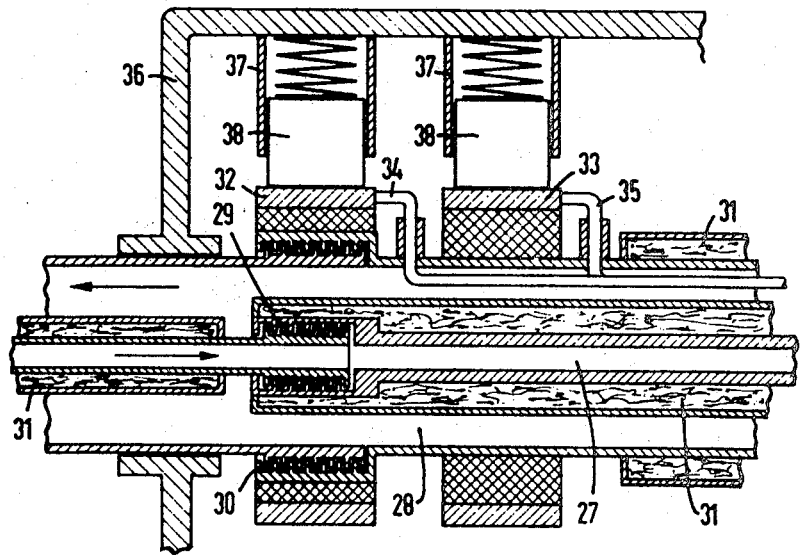
FIG. 8 is a cross-sectional view of a cooling arrangement according to the invention.

In FIG. 8, there is illustrated an arrangement for providing a cooling medium. In this arrangement, the rotor has a central hollow space 27 into which the cooling medium is introduced and an annular hollow space 28 from which the cooling medium is removed. The connection to stationary tubes is provided through labyrinth seals 29 and 30. The central hollow space 27 and the annular hollow space are heat insulated by vacuum jackets contained with crumpled foils 31. The heat insulation is interrupted at the location of the slip rings 32 and 33 so that the latter are cooled through the outflowing cooling medium. The electrical cables 34 and 35 are guided by the slip rings directly into annular hollow space 28 of the outflowing cooling medium and thereby maintained at an appropriately low temperature. Thereby, the electrical resistance of the conductors in cables 34 and 35, through which there may flow a current of about 100 amperes is maintained quite low. In FIG. 8, there can also be seen a portion of the housing 36, brush holders 37 and brushes 38.

It will be obvious to those skilled in the art upon studying this disclosure that electric machines having a superconducting excitation winding according to my invention permit of a great variety of modifications and hence can be given embodiments other than those particularly illustrated and described herein without departing from the essential features of my invention and within the scope of the claims annexed hereto.

I claim:

1. An electric machine comprising a rotor having an elongated iron core, carrier band means mounted substantially at the surface of said iron core and having opposing portions extending in the longitudinal direction of said iron core, a superconductive excitation winding carried by said carrier band means and wound around said iron core in the direction of said carrier band means, and tie rod means connecting said portions of said carrier band means, said winding and said iron core being adapted to produce magnetic forces therebetween compensating for most of a centrifugal force to which said winding is subject during rotation of said rotor, said tie rods being adapted to absorb the balance of said centrifugal force.

2. An electric machine as defined in claim 1, wherein said tie rod means comprises a plurality of tie rods disposed in radial arrays in planes perpendicular to the rotational axis of said rotor.

3. An electric machine as defined in claim 2 wherein said tie rods are attached to said core.

4. An electric machine as defined in claim 1 in which said tie rod means comprises a plurality of tie rods disposed in an equilateral polygonal array about the axis of rotation of said rotor.

5. An electric machine as defined in claim 1 and further including positioning tie rods connected between said carrier band means and said groove rod for maintaining positioned portions of said carrier band to capture the tangential and gravity forces acting upon said carrier band.

6. An electric machine as defined in claim 5 and further including spacers disposed adjacent said carrier band means for absorbing said captured tangential and gravity forces.

7. An electric machine as defined in claim 1 wherein each coil of said excitation winding is substantially wound in a plane and comprises two straight and two semicircular portions.

8. An electric machine as defined in claim 7 wherein said carrier band means comprises a band of good heat-conducting non-magnetic material, said superconducting winding being inserted into said band.

9. An electric machine as defined in claim 8 and further including a U-shaped bus bar, said superconducting winding being positioned within said bus bar, said bus bar being inserted into said carrier band.

10. An electric machine as defined in claim 1 and further including a damping winding on said rotor.

11. An electric machine as defined in claim 1 wherein said rotor has a central opening longitudinally therethrough for introducing cooling medium thereinto and an annular hollow space provided therearound for removing said cooling medium therefrom.

12. Electric machine according to claim 1, including a hollow groove rod coextensive with said carrier band means, thermal insulating means surrounding said carrier band means and received therewith in the hollow of said rod, said iron core being formed with at least one groove at the surface thereof, said hollow groove rod with said thermally insulated carrier band means therein being disposed in the groove formed in said iron core.

13. Electric machine according to claim 1, including a cooling coil surrounding said carrier band means.

14. Electric machine according to claim 12, wherein said groove rod is formed of subdivided portions extending in the longitudinal direction thereof, a portion of said groove rod being located diametrically inward of said hollow formed in said groove rod and consisting of high-saturation magnetic material.

15. Electric machine according to claim 1, including thermal insulation means surrounding said tie rod means.

16. Electric machine according to claim 11, wherein said central opening and said annular hollow space form part of a flow path for said cooling medium through said rotor, and including labyrinth seals for sealing junctions of said flow path with stationary ducts for said cooling medium.

17. Electric machine according to claim 16, wherein said annular hollow space is enclosed by a surrounding tube, and including slip rings mounted on said surrounding tube and in at least partial contact therewith so as to be cooled by the coolant medium being removed through said annular hollow space therein.

18. Electric machine according to claim 12, wherein said iron core is composed of a plurality of laminations formed with at least one notch at the periphery thereof, said laminations being stackable in said superconductive winding, with said notches thereof aligned so as to form the groove located at the surface of said iron core wherein said hollow groove rod, with said carrier band means carrying said superconductive winding, is received.

References Cited

UNITED STATES PATENTS 3,239,697  3/1966  Stekly _____ 310—10

FOREIGN PATENTS 699,685  12/1940  Germany.

DAVID X. SLINEY, Primary Examiner

U.S. Cl. X.R.

310—54, 214, 262